United States Patent
Qiao et al.

(10) Patent No.: US 8,479,700 B2
(45) Date of Patent: Jul. 9, 2013

(54) IRON-CHROMIUM ALLOY WITH IMPROVED COMPRESSIVE YIELD STRENGTH AND METHOD OF MAKING AND USE THEREOF

(75) Inventors: Cong Yue Qiao, Menominee, MI (US); Todd Trudeau, Menominee, MI (US)

(73) Assignee: L. E. Jones Company, Menominee, MI (US)

(*) Notice: Subject to any disclaimer, the term of this patent is extended or adjusted under 35 U.S.C. 154(b) by 824 days.

(21) Appl. No.: 12/652,635

(22) Filed: Jan. 5, 2010

(65) Prior Publication Data

US 2011/0162612 A1 Jul. 7, 2011

(51) Int. Cl.
*F01L 3/02* (2006.01)

(52) U.S. Cl.
USPC ........ 123/188.3; 419/8; 251/359; 29/890.122

(58) Field of Classification Search
USPC .. 123/188.3; 420/12, 64, 69; 419/8; 251/359; 29/888.06, 890.122
See application file for complete search history.

(56) References Cited

U.S. PATENT DOCUMENTS

| | | | |
|---|---|---|---|
| 1,245,552 A | 11/1917 | Becket | |
| 1,790,177 A | 1/1931 | Stoody | |
| 2,268,426 A | 12/1941 | Schlumpf et al. | |
| 3,086,858 A | 4/1963 | Edminster et al. | |
| 3,410,682 A | 11/1968 | Avery et al. | |
| 3,690,956 A * | 9/1972 | Thompson | 148/542 |
| 3,859,086 A | 1/1975 | Church et al. | |
| 3,969,109 A | 7/1976 | Tanczyn | |
| 3,986,867 A | 10/1976 | Masumoto et al. | |
| 4,043,842 A | 8/1977 | Joiret | |
| 4,078,920 A | 3/1978 | Liljas et al. | |
| 4,086,107 A | 4/1978 | Tanino et al. | |

(Continued)

FOREIGN PATENT DOCUMENTS

| | | |
|---|---|---|
| GB | 2298869 A | 9/1996 |
| JP | 54-096418 A | 7/1979 |
| JP | 2000-239779 * | 9/2000 |

OTHER PUBLICATIONS

Cortie, M.B. et al., "Experimental Processing of FeCr Sigma-Phase Powders", Materials Forum, vol. 29, Published 2005, Institute of Materials Engineering Australasia Ltd., pp. 262-267.

(Continued)

*Primary Examiner* — Thanh Truong
*Assistant Examiner* — Ruben Picon-Feliciano
(74) *Attorney, Agent, or Firm* — Buchanan Ingersoll & Rooney PC

(57) ABSTRACT

A chromium-iron alloy comprises in weight %, 1 to 3% C, 1 to 3% Si, up to 3% Ni, 25 to 35% Cr, 1.5 to 3% Mo, up to 2% W, 2.0 to 4.0% Nb, up to 3.0% V, up to 3.0% Ta, up to 1.2% B, up to 1% Mn and 43 to 64% Fe. In a preferred embodiment, the chromium-iron alloy comprises in weight %, 1.5 to 2.3% C, 1.6 to 2.3% Si, 0.2 to 2.2% Ni, 27 to 34% Cr, 1.7 to 2.5% Mo, 0.04 to 2% W, 2.2 to 3.6% Nb, up to 1% V, up to 3.0% Ta, up to 0.7% B, 0.1 to 0.6% Mn and 43 to 64% Fe. The chromium-iron alloy is useful for valve seat inserts for internal combustion engines such as diesel or natural gas engines.

16 Claims, 3 Drawing Sheets

U.S. PATENT DOCUMENTS

| | | | |
|---|---|---|---|
| 4,141,762 A | 2/1979 | Yamaguchi et al. | |
| 4,162,930 A | 7/1979 | Abe et al. | |
| 4,200,457 A | 4/1980 | Cape | |
| 4,218,268 A | 8/1980 | Hiraishi et al. | |
| 4,222,773 A | 9/1980 | Degerbeck | |
| 4,363,660 A | 12/1982 | Wakita et al. | |
| 4,435,483 A | 3/1984 | Ahslund et al. | |
| 4,487,630 A | 12/1984 | Crook et al. | |
| 4,487,744 A | 12/1984 | DeBold et al. | |
| 4,494,998 A | 1/1985 | Ueda et al. | |
| 4,581,202 A | 4/1986 | Kudo et al. | |
| 4,689,198 A | 8/1987 | Fujiwara et al. | |
| 4,740,353 A | 4/1988 | Cogan et al. | |
| 4,929,288 A | 5/1990 | Borges | |
| 4,999,159 A | 3/1991 | Uematsu et al. | |
| 5,096,515 A | 3/1992 | Kawamura et al. | |
| 5,194,220 A | 3/1993 | Takahashi et al. | |
| 5,194,221 A | 3/1993 | Culling | |
| 5,238,508 A | 8/1993 | Yoshitake et al. | |
| 5,320,801 A | 6/1994 | Culling | |
| 5,501,835 A | 3/1996 | Watanabe et al. | |
| 5,582,656 A | 12/1996 | Kangas et al. | |
| 5,252,149 B1 | 9/1998 | Dolman | |
| 6,033,626 A | 3/2000 | Takahashi | |
| 6,165,288 A | 12/2000 | Dwars et al. | |
| 6,200,688 B1 * | 3/2001 | Liang et al. | 428/544 |
| 6,214,289 B1 | 4/2001 | Sikka et al. | |
| 6,254,660 B1 | 7/2001 | Bernard et al. | |
| 6,383,310 B1 | 5/2002 | Otsuka et al. | |
| 6,436,338 B1 | 8/2002 | Qiao | |
| 6,485,678 B1 | 11/2002 | Liang et al. | |
| 6,511,554 B1 | 1/2003 | Kawano et al. | |
| 6,702,905 B1 | 3/2004 | Qiao et al. | |
| 6,761,777 B1 | 7/2004 | Radon | |
| 6,764,555 B2 | 7/2004 | Hiramatsu et al. | |
| 6,767,416 B2 | 7/2004 | Ishibashi et al. | |
| 6,958,084 B2 | 10/2005 | Whitaker et al. | |
| 7,118,636 B2 | 10/2006 | Chen et al. | |
| 7,235,116 B2 | 6/2007 | Rodrigues et al. | |
| 7,347,903 B2 | 3/2008 | Yamadera et al. | |
| 7,611,590 B2 | 11/2009 | Liang | |
| 2004/0258554 A1 | 12/2004 | Radon | |
| 2006/0157161 A1 | 7/2006 | Muralidharan et al. | |
| 2007/0086910 A1 | 4/2007 | Liang | |
| 2007/0144622 A1 | 6/2007 | Flahaut | |

OTHER PUBLICATIONS

Dieter, George E., "Metallurgical Fundamentals", Mechanical Metallurgy Third Edition, McGraw-Hill, Inc., 1986, pp. 220-226.

Folkhard, Erich et al., "The Ternary Iron-Chromium-Nickel Constitution Diagram", Welding Metallurgy of Stainless Steels, Springer-Verlag/Wien, New York, 1988, pp. 5-19.

Norton, J. F. et al., "The Corrosion Behavior of Several Fe and Ni-Base Alloys Exposed to a Reducing-Sulphidizing Atmosphere at 600° C.", Proceedings of the 2nd International Conference on Heat-Resistant Materials, Gatlinburg, Tennessee, Sep. 11-14, 1995, pp. 111-120.

Stansbury, E.E. et al., "Anodic Polarization of Several Active-Passive Alloy Systems", Fundamentals of Electrochemical Corrosion, The Materials Information Society, ASM International, Ohio, 2000, pp. 206-211.

Wang, Y.S. et al., "Wear and Wear Mechanism Simulation of Heavy-Duty Engine Intake Valve and Seat Inserts", ASM International, Journal of Materials Engineering and Performance, vol. 7(1), Feb. 1998, p. 53.

International Search Report and Written Opinion mailed Sep. 26, 2011 for PCT/US2010/003245.

* cited by examiner

IRON-CHROMIUM ALLOY WITH IMPROVED COMPRESSIVE YIELD STRENGTH AND METHOD OF MAKING AND USE THEREOF

BACKGROUND

More restrictive exhaust emissions laws for diesel and natural gas engines and high power output for internal combustion engines have driven changes in engine design including the need for high-pressure electronic fuel injection systems in diesel engines and stoichiometric combustion in natural gas engines. Engines built according to the new designs use higher combustion pressures, higher operating temperatures and less lubrication than previous designs. Components of the new designs, including valve seat inserts (VSI), have experienced significantly higher wear rates. Intake and exhaust valve seat inserts and valves, for example, must be able to withstand a high number of valve impact events and combustion events with minimal wear (e.g., abrasive, adhesive, and corrosive wear). This has motivated a shift in materials selection toward materials that offer improved wear resistance relative to the valve seat insert materials that have traditionally been used by the diesel and natural gas industry.

Another emerging trend in diesel engine development is the use of EGR (exhaust gas recirculation). With EGR, exhaust gas is routed back into the intake air stream to reduce nitric oxide ($NO_x$) content in exhaust emissions. The use of EGR in diesel or natural gas engines can raise the operating temperatures of valve seat inserts. Accordingly, there is a need for lower cost valve seat inserts having good mechanical properties including hot hardness and compressive yield strength for use in diesel and natural gas engines using EGR.

Also, because exhaust gas contains compounds of nitrogen, sulfur, chlorine, and other elements that potentially can form acids, the need for improved corrosion resistance for alloys used in valve seat inserts is increased for diesel and natural gas engines using EGR. Acid can attack valve seat inserts and valves leading to premature engine failure.

SUMMARY

A chromium-iron alloy comprises in weight %, 1 to 3% C (preferably 1.5 to 2.3%, further preferably 1.6 to 2.2%), 1 to 3% Si (preferably 1.6 to 2.3%, further preferably 1.7 to 2.3%), up to 3% Ni (preferably 0.2 to 2.2%), 25 to 35% Cr (preferably 27 to 34%, further preferably 28 to 32.5%), 1.5 to 3% Mo (preferably 1.7 to 2.5%), up to 2% W (preferably 0.04 to 2%, further preferably 0.4 to 1.5%), 2.0 to 4.0% Nb (preferably 2.2 to 3.6%), up to 3.0% V (preferably up to 1%), up to 3.0% Ta (preferably up to 1%), up to 1.2% B (preferably up to 0.7%), up to 1% Mn (preferably 0.1 to 0.6%) and 43 to 64% Fe and incidental impurities. In a preferred embodiment, the chromium-iron alloy comprises in weight %, 1.9 to 2.0% C, 2 to 2.1% Si, 1.6 to 2.0% Ni, 31.3 to 31.9% Cr, 1.9 to 2.0% Mo, 1 to 1.5% W, 3.1 to 3.4% Nb, 0.003 to 0.05% V, up to 0.5% Ta, 0.4 to 0.6% B, 0.2 to 0.5% Mn and 54 to 56% Fe and incidental impurites.

The chromium-iron alloy has an as-cast microstructure composed of primary carbide (about 40 to 60 volume %, preferably about 50 volume %) and high Cr/Mo ferrite (about 40 to 60 volume %, preferably about 50 volume %) matrix with Nb-rich (carbides, nitrides, carbonitrides) strengthening phases. The term "about" as used herein to describe numerical values is intended to cover a range of plus or minus 10% of the numerical value. The primary carbides are preferably acicular carbides 2.5 microns or smaller and the strengthening phases are preferably polyhedron-shaped carbides, nitrides and/or carbonitrides 10 microns or smaller.

The chromium-iron alloy can be a casting with an as-cast bulk hardness from 40 to 56 Rockwell C; a hot hardness (HV10) from 450 to 500 at about 75° F., from 280 to 300 at about 1000° F., from 55 to 70 at about 1600° F.; a compressive yield strength from 80 to 220 KSi at about 75° F., from 60 to 130 at about 1000° F.; a linear thermal expansion coefficient from $8 \times 10^{-6}$ to $13 \times 10^{-6}$/° C.

The chromium-iron alloy described above is useful as a valve seat insert for engine applications such as diesel or natural gas engines. Preferably, the insert exhibits a dimensional stability of less than $0.3 \times 10^{-3}$ inches per inch change in insert outside diameter (O.D.) after aging for about 20 hours at about 1200° F.

A method of operating an internal combustion engine is provided. In operating an internal combustion engine such as a diesel or natural gas engine, a valve is closed against the valve seat insert to close a cylinder of the internal combustion engine and the fuel is ignited in the cylinder to operate the internal combustion engine. The valve is preferably composed of a high-chromium iron-based alloy or a high-temperature, nickel-based superalloy; or the valve is hard-faced with a high temperature, wear-resistant alloy strengthened by carbides.

A method of making a chromium-iron alloy as described above is provided. The chromium-iron alloy can be cast from a melt into a shaped component at a temperature from about 2700° F. to about 3000° F.; or a powder of the chromium-iron alloy can be pressed into a shaped component and sintered at a temperature from about 1950° F. to about 2300° F. in a reducing atmosphere. The reducing atmosphere can be hydrogen or a mixture of dissociated ammonia and nitrogen. The shaped component can be a valve seat insert and precipitation hardening heat treated at a temperature from about 900° F. to about 1700° F. for about 2 hours to about 15 hours. The heat treating can be performed in an inert, oxidizing, or reducing atmosphere, or in a vacuum.

DETAILED DESCRIPTION

Figure 1:
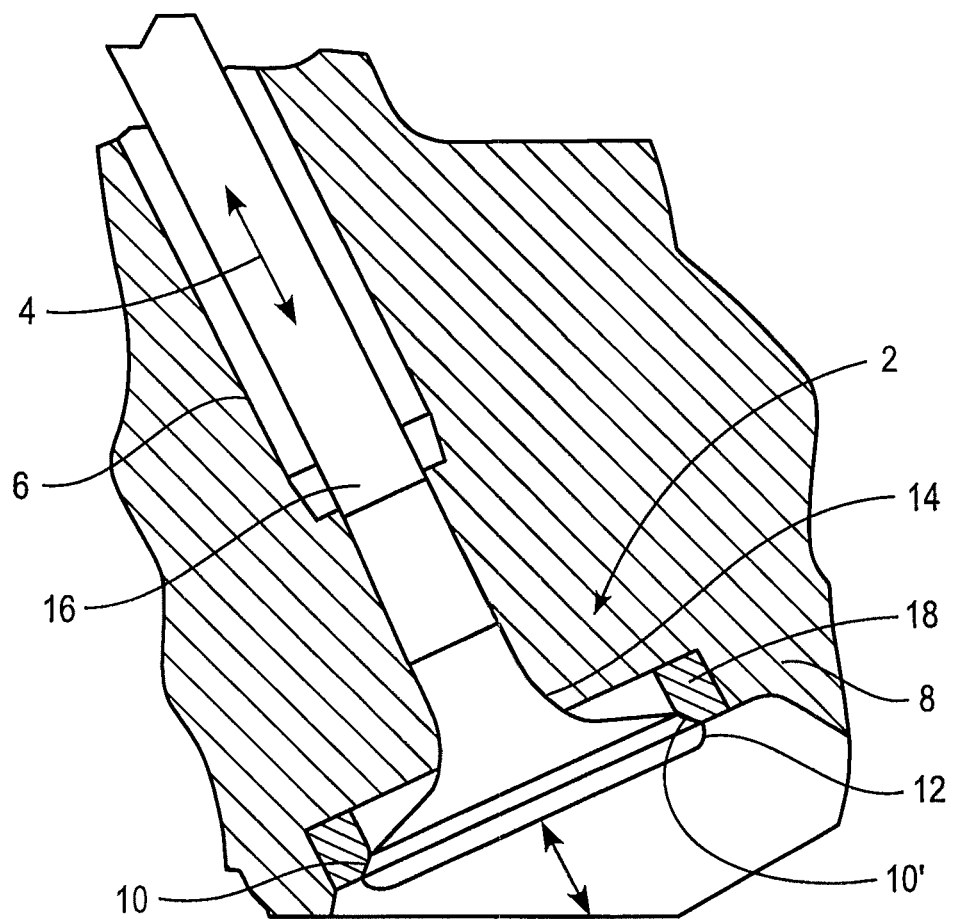
FIG. 1 is a cross-sectional view of a valve assembly incorporating a valve seat insert of a chromium-iron alloy (referred to herein as the J153 alloy).

FIG. 1 illustrates an exemplary engine valve assembly 2. Valve assembly 2 includes a valve 4, which is slideably supported within the internal bore of a valve stem guide 6. The valve stem guide 6 is a tubular structure that fits into the cylinder head 8. Arrows illustrate the direction of motion of the valve 4. Valve 4 includes a valve seat face 10 interposed between the cap 12 and neck 14 of the valve 4. Valve stem 16 is positioned above neck 14 and is received within valve stem guide 6. A valve seat insert 18 having a valve seat insert face 10' is mounted, such as by press-fitting, within the cylinder head 8 of the engine. The cylinder head usually comprises a casting of cast iron, aluminum or an aluminum alloy. Preferably, the insert 18 (shown in cross section) is annular in shape and the valve seat insert face 10' engages the valve seat face 10 during movement of valve 4.

Disclosed herein is a novel chromium-iron alloy (referred to herein as "J153 alloy") for valve-train material applications, preferably internal combustion valve seat inserts. The chromium-iron alloy (J153 alloy) comprises in weight %, 1 to 3% C (preferably 1.5 to 2.3%, further preferably 1.6 to 2.2%), 1 to 3% Si (preferably 1.6 to 2.3%, further preferably 1.7 to 2.3%), up to 3% Ni (preferably 0.2 to 2.2%), 25 to 35% Cr (preferably 27 to 34%, further preferably 28 to 32.5%), 1.5 to 3% Mo (preferably 1.7 to 2.5%), up to 2% W (preferably 0.04 to 2%, further preferably 0.4 to 1.5%), 2.0 to 4.0% Nb (preferably 2.2 to 3.6%), up to 3.0% V (preferably up to 1%), up to 3.0% Ta (preferably up to 1%), up to 1.2% B (preferably up to 0.7%), up to 1% Mn (preferably 0.1 to 0.6%) and 43 to 64% Fe and incidental impurities.

The microstructure of the J153 alloy is designed to produce a secondary strengthening phase dispersed uniformly throughout a microstructure of Cr-rich primary carbide and high chromium ferrite. The as-cast microstructure of the J153 alloy can contain about 40 to 60 volume %, preferably about 50 volume % ferrite, and about 40 to 60 volume %, preferably about 50 volume % ferrite primary carbide. MC type carbides, MN type nitrides or MCN type carbonitrides are uniformly distributed throughout the ferrite-carbide matrix in a form of spherical and/or polyhedron-shaped particles, wherein M represents a strong MC, MN or MCN former such as Nb. In addition, fine boron-rich phases are also uniformly dispersed along boundary regions between the Cr-rich primary carbide and high chromium ferrite. The uniform distribution of the spherical and/or polyhedron-shaped particles create secondary strengthening by impeding matrix displacement under compressive stress and thus enhance the J153 alloy's isotropic mechanical properties. The spherical and/or polyhedron-shaped particles create a significant secondary strengthening effect by impeding the matrix displacement under stress, thus enhance the isotropic behavior of the J153 alloy. The primary carbides are preferably acicular carbides 2.5 microns or smaller in width and the strengthening phases are preferably polyhedron-shaped carbides, nitrides and/or carbonitrides 5 microns or smaller. The J153 alloy does not include any substantial amount of martensite and austenite phases.

Carbon is a significant alloying element in the J153 alloy, which affects alloy castability, microstructure, solidification substructure, and mechanical metallurgical behavior. In general, an increase in carbon content can enhance the molten metal fluidity of steels. However, because carbon is a strong austenite former in steels, a high carbon content can promote austenite formation. It has been determined that the suitable carbon content in the J153 alloy is 1 to 3 weight % preferably 1.5 to 2.3 weight %, further preferably 1.6 to 2.2 weight %.

Boron can be used to enhance hardness of the J153 alloy. Because boron has a low solubility in iron-based alloys, free boron atoms and/or boron-rich compounds have a tendency to distribute along grain boundaries and solidification cell boundaries. As a result, boron and/or borides can promote finer microstructures and solidification substructures. In the J153 alloy system, an increase in boron content significantly increases the bulk hardness of the as-cast alloy. It has been determined that the suitable boron content in the J153 alloy is up to 1.2 weight %, preferably up to 0.7 weight %. Preferably, the content of B is less than the content of C.

Niobium has a strong affinity to carbon in iron-based materials and thus, the tendency of niobium carbide (NbC) formation is much greater than chromium carbide. Niobium can also form niobium nitride (NbN) and/or niobium carbonitride (NbCN) particles. The introduction of niobium into iron-based alloys can significantly minimize intergranular corrosion propensity. Furthermore, niobium carbides/nitrides/carbonitrides generally form as small spherical and/or polyhedron-shaped particles, which is distributed uniformly in the ferrite-carbide matrix. Thus, niobium carbides/nitrides/carbonitrides function as a primary strengthening mechanism for the J153 alloy. It has been determined that the suitable niobium content in the J153 alloy is 2.0 to 4.0 weight %, preferably 2.2 to 3.6 weight %. Preferably, the content of Nb is at least 0.4 weight % more than the content of C.

Nickel is an austenite former and thus an optional addition but may be present in amounts up to 2.5% due to residual Ni from prior casting procedures wherein Ni-containing alloys were melted in the furnace. However, the role of nickel in a ferritic alloy is to strengthen the ferrite phase through solid-solution strengthening. Although nickel does not form a carbide in iron-based alloys, the addition of nickel to the J153 alloy can be used to augment hardness. It has been determined that the suitable nickel content in the J153 alloy is up to 3.0 weight %, preferably 0.2 to 2.2 weight %. Preferably, the content of Nb is greater than the content of Ni. Preferably the content of Ni is greater than the content of B.

Tungsten has a strong affinity to carbon in high chromium iron-based materials, resulting in the formation of chromium and tungsten rich primary carbides. Additionally, tungsten can also react with iron to form iron-tungsten intermetallic phases. Thus, the addition of tungsten in the J153 alloy can increase the alloy strength and hardness. It has been determined that the suitable tungsten content in the J153 alloy is up to 2.0 weight %, preferably 0.04 to 2.0 weight %, further preferably 0.4 to 1.5 weight %. Preferably, the content of C is at least 0.45 weight % more than the content of W.

Molybdenum is a carbide former and is likely to join with chromium to form primary carbides. It has been determined that the suitable molybdenum content in the J153 alloy is 1.5 to 3 weight %, preferably 1.7 to 2.5 weight %. The ratio of the content of Cr to the content of Mo is at least 10:1.

Manganese is an austenite former. It has been determined that the suitable manganese content in the J153 alloy is up to 1.0 weight %, preferably 0.1 to 0.6 weight %.

Silicon is an alloying element which can significantly affect castablity and solidification mode. In addition, silicon expands that range for the formation of the σ-iron-chromium phase. It has been determined that the suitable silicon content in the J153 alloy is 1 to 3 weight %, preferably 1.6 to 2.3 weight %, further preferably 1.7 to 2.3 weight %.

Chromium is a ferrite and carbide former and appears in the microstructure as high chromium ferrite and Cr-rich primary carbide. Chromium also contributes to improving corrosion resistance of the J153 alloy. It has been determined that the suitable chromium content in the J153 alloy is 25 to 35 weight %, preferably 27 to 34 weight %, further preferably 28 to 33.5 weight %.

Carbide formers such as vanadium and tantalum are optional and can be added in amounts of up to 3 weight % each, preferably up to 1 weight % each.

Evaluation of J153 Alloy

Twenty-seven trials of J153 experimental heats (i.e., 60 pound lots) were fabricated to design and optimize ferrite-carbide microstructural features in an iron-chromium alloy containing a target 33 weight % Cr. Microstructural control can be achieved through the controlled addition of ferrite forming alloying elements (such as Cr, Mo, W and Nb) and the ability to control carbide formation. The casting temperature can range from about 2700° F. to about 3000° F., depending upon the size of the casting. The castings were prepared in an open-air induction furnace. The J153 alloy can be compositionally adjusted to optimize bulk hardness and strength. The compositions of the twenty-seven heats are summarized in TABLES 1-9. Bulk hardness was characterized by Rockwell hardness tests, scale C (i.e., HRC).

Trials 1 and 2 are the first two trials in the development of J153 alloy. The compositions and measured bulk hardness of Trials 1 and 2 are summarized in TABLE 1.

In Trial 1, in addition to primary carbide and ferrite phases, undesirable microstructural features, such as martensite and retained austenite were observed. Due to the presence of martensite, the bulk hardness value for Trial 1 was about 55.5 HRC. Although Trial 1 exhibited a high bulk hardness, it did not contain the desired J153 matrix microstructures of high chromium ferrite plus high chromium primary carbide.

In Trial 2, the composition of Trial 1 was adjusted to significantly reduce the nickel, boron and tungsten contents and to increase the chromium content. Trial 2 has the desired microstructure of alternately distributed primary carbides and ferrites with secondary strengthening phases uniformly distributed in the ferrites. The hardness of the alloy in Trial 2 was reduced to about 41.5 HRC.

In Trials 3 and 4, the content of boron, chromium, niobium and tungsten were adjusted to optimize bulk hardness, based on the results of Trials 1 and 2. The compositions and measured bulk hardness of Trials 3 and 4 are summarized in TABLE 2.

TABLE 2

| Trial | Heat | C | Mn | Si | Cr | Mo | W | Nb | Ni | B | Fe | V | HRC |
|---|---|---|---|---|---|---|---|---|---|---|---|---|---|
| 3 | 7K05XA | 1.965 | 0.333 | 2.263 | 30.81 | 1.961 | 1.040 | 2.379 | 2.071 | 0.449 | 56.61 | 0.031 | 51.0 |
| 4 | 7K12XA | 1.882 | 0.326 | 2.081 | 30.55 | 1.971 | 0.955 | 2.615 | 1.969 | 0.456 | 56.98 | 0.036 | 47.0 |

In Trials 5-8, the effects of varying boron content from about 0.48 weight % to about 0.7 weight % on bulk hardness was assessed, for a carbon content of about 1.8 weight % to 1.9 weight %. The compositions and measured bulk hardness of Trials 5-8 are summarized in TABLE 3.

TABLE 3

| Trial | Heat | C | Mn | Si | Cr | Mo | W | Nb | Ni | B | Fe | V | HRC |
|---|---|---|---|---|---|---|---|---|---|---|---|---|---|
| 5 | 7K26XA | 1.881 | 0.351 | 1.924 | 32.33 | 1.993 | 0.579 | 3.167 | 1.600 | 0.708 | 55.30 | 0.037 | 48.0 |
| 6 | 7L03XA | 1.897 | 0.300 | 2.022 | 31.52 | 1.975 | 1.012 | 2.830 | 1.996 | 0.615 | 55.68 | 0.038 | 49.0 |
| 7 | 7L10XA | 1.778 | 0.300 | 1.906 | 30.43 | 1.982 | 1.168 | 2.218 | 2.062 | 0.384 | 57.64 | 0.036 | 45.0 |
| 8 | 7L23XA | 1.800 | 0.407 | 1.924 | 30.14 | 1.921 | 1.314 | 2.428 | 1.906 | 0.476 | 57.53 | 0.029 | 45.5 |

As illustrated in TABLE 3, bulk hardness is enhanced by increasing boron content. Increasing boron content from about 0.48 weight % to about 0.7 weight % results in an increase in bulk hardness, from about 45 HRC (Trials 7 and 8) to about 48-49 HRC (Trials 5 and 6).

In Trials 9 and 10, the effects of increasing carbon, niobium and nickel while lowering tungsten and manganese was evaluated. The compositions and measured hardness of Trials 9 and 10 are summarized in TABLE 4.

TABLE 1

| Trial | Heat | C | Mn | Si | Cr | Mo | W | Nb | Ni | B | Fe | V | HRC |
|---|---|---|---|---|---|---|---|---|---|---|---|---|---|
| 1 | 7J22XA | 1.734 | 0.460 | 1.625 | 27.95 | 1.838 | 0.651 | 3.580 | 1.879 | 1.157 | 58.88 | 0.042 | 55.5 |
| 2 | 7J22XB | 1.959 | 0.394 | 1.931 | 33.70 | 2.261 | 0.042 | 3.019 | 0.243 | 0.206 | 56.05 | 0.044 | 41.5 |

TABLE 4

| Trial | Heat | C | Mn | Si | Cr | Mo | W | Nb | Ni | B | Fe | V | HRC |
|---|---|---|---|---|---|---|---|---|---|---|---|---|---|
| 9 | 8A02XA | 1.865 | 0.368 | 2.052 | 31.13 | 2.400 | 1.008 | 2.769 | 1.863 | 0.500 | 55.92 | 0.019 | 44.5 |
| 10 | 8A02XB | 2.140 | 0.160 | 2.030 | 31.98 | 2.350 | 0.680 | 3.200 | 2.17 | 0.470 | 54.34 | 0.030 | 45.0 |

As illustrated in TABLE 4, increasing carbon, niobium and nickel while lowering tungsten and manganese resulted in a minimal change in bulk hardness.

In Trials 11-13, the effects of varying the combined effect of niobium, vanadium, carbon and boron were evaluated. The compositions and measured bulk hardness of Trials 11-13 are summarized in TABLE 5.

TABLE 5

| Trial | Heat | C | Mn | Si | Cr | Mo | W | Nb | Ni | B | Fe | V | HRC |
|---|---|---|---|---|---|---|---|---|---|---|---|---|---|
| 11 | 8A04XA | 1.840 | 0.428 | 1.914 | 28.61 | 2.004 | 1.057 | 2.728 | 2.096 | 0.601 | 58.59 | 0.014 | 48.0 |
| 12 | 8A09XA | 1.819 | 0.436 | 2.000 | 30.52 | 2.019 | 0.999 | 2.559 | 2.031 | 0.475 | 57.01 | 0.015 | 48.0 |
| 13 | 8B01XA | 1.991 | 0.313 | 2.050 | 30.68 | 1.973 | 0.979 | 3.531 | 1.993 | 0.536 | 54.88 | 0.982 | 47.5 |

Trials 11-13 illustrate that varying niobium, vanadium, carbon, manganese and boron contents resulted in little change in bulk hardness from about 47.5 HRC to 48 HRC. Furthermore, Trials 11-13 illustrate that the effects of vanadium on bulk hardness were minimal.

In Trials 14-19, the effects of varying boron were determined for a target 1.95 weight % carbon and a target 1.9 weight % silicon. The boron content was varied from about 0 weight % to about 0.5 weight %. The compositions and measured bulk hardness of Trials 14-19 are summarized in TABLE 6.

TABLE 6

| Trial | Heat | C | Mn | Si | Cr | Mo | W | Nb | Ni | B | Fe | V | HRC |
|---|---|---|---|---|---|---|---|---|---|---|---|---|---|
| 14 | 8B11XA | 1.971 | 0.336 | 1.954 | 29.87 | 1.949 | 1.216 | 2.736 | 2.066 | 0.014 | 55.77 | 0.031 | 42.0 |
| 15 | 8B12Q | 1.924 | 0.506 | 2.016 | 30.49 | 1.986 | 1.153 | 2.600 | 0.512 | 0.000 | 58.66 | 0.036 | 40.5 |
| 16 | 8B15Y | 1.976 | 0.457 | 1.968 | 32.42 | 1.908 | 0.952 | 2.747 | 0.486 | 0.193 | 56.74 | 0.037 | 41.5 |
| 17 | 8D30XA | 1.944 | 0.377 | 1.992 | 30.62 | 1.972 | 1.082 | 2.678 | 1.939 | 0.476 | 56.79 | 0.017 | 48.5 |
| 18 | 8E15XA | 1.955 | 0.397 | 1.881 | 32.03 | 1.882 | 0.604 | 3.070 | 0.263 | 0.334 | 57.31 | 0.094 | 43.0 |
| 19 | 8E21XA | 1.985 | 0.328 | 1.816 | 30.30 | 2.018 | 1.165 | 2.637 | 1.922 | 0.512 | 57.20 | 0.010 | 48.0 |

As illustrated in TABLE 6, varying boron content from about 0 weight % to about 0.5 weight % resulted in an increase in bulk hardness from about 40.5 HRC to about 48.0 HRC.

In Trials 20-22, the effects of varying tungsten, niobium, nickel and boron was determined, for a carbon content of more than 2 weight %. The compositions and measured hardness of Trials 20-22 are summarized in TABLE 7.

TABLE 7

| Trial | Heat | C | Mn | Si | Cr | Mo | W | Nb | Ni | B | Fe | V | HRC |
|---|---|---|---|---|---|---|---|---|---|---|---|---|---|
| 20 | 8E29XA | 2.095 | 0.415 | 1.775 | 31.60 | 1.915 | 0.486 | 3.380 | 0.244 | 0.339 | 57.63 | 0.009 | 50.0 |
| 21 | 8E30XA | 2.008 | 0.417 | 1.743 | 30.45 | 2.041 | 1.099 | 2.644 | 1.914 | 0.522 | 57.04 | 0.007 | 45.0 |
| 22 | 8F11XA | 2.052 | 0.390 | 1.785 | 30.21 | 1.856 | 1.233 | 2.925 | 2.002 | 0.503 | 59.90 | 0.005 | 48.0 |

As illustrated in TABLE 7, varying niobium content from about 2.64 weight % (Trial 21) to about 3.38 weight % (Trial 20) resulted in an increase in bulk hardness from about 45.0 HRC to about 50.0 HRC. Trial 22 contained an intermediate Nb content compared to Trials 20-21 but higher nickel and tungsten content, and exhibited an intermediate hardness value of 48 HRC. Trails 20-22 illustrate that bulk hardness is likely associated with the formation of niobium-rich carbides, nitrides and/or carbonitrides.

In Trials 23-25, the effect of lower contents of carbon, chromium and boron was evaluated for maintaining a bulk hardness from about 43 HRC to about 49 HRC for a target niobium content of about 2.6 weight %. The compositions and measured bulk hardness of Trials 20-22 are summarized in TABLE 8.

TABLE 8

| Trial | Heat | C | Mn | Si | Cr | Mo | W | Nb | Ni | B | Fe | V | HRC |
|---|---|---|---|---|---|---|---|---|---|---|---|---|---|
| 23 | 8F25XA | 1.609 | 0.318 | 1.722 | 29.53 | 1.913 | 0.991 | 2.506 | 1.975 | 0.464 | 58.89 | 0.004 | 44.3 |
| 24 | 8F30XA | 1.845 | 0.321 | 1.789 | 30.46 | 1.867 | 1.137 | 2.771 | 2.095 | 0.522 | 57.10 | 0.002 | 49.0 |
| 25 | 8G01XA | 1.692 | 0.270 | 1.931 | 32.00 | 1.804 | 1.099 | 2.661 | 2.160 | 0.516 | 55.75 | 0.004 | 47.0 |

Bulk hardness of about 44.3 HRC was observed in Trial 23. As illustrated in Trials 24 and 25, bulk hardness can be increased to 47 to 49 HRC by increasing carbon, chromium, niobium or boron contents.

Trials 26 and 27, summarized in TABLE 9, represent the final production heats used to cast valve seat insert components.

TABLE 9

| Trial | Heat | C | Mn | Si | Cr | Mo | W | Nb | Ni | B | Fe | V | HRC |
|---|---|---|---|---|---|---|---|---|---|---|---|---|---|
| 26 | 8G24XA | 1.944 | 0.298 | 2.042 | 31.32 | 1.941 | 1.179 | 3.125 | 1.603 | 0.544 | 55.92 | 0.004 | 47.5 |
| 27 | 8J27W | 1.986 | 0.432 | 2.074 | 31.82 | 1.958 | 1.422 | 3.332 | 1.942 | 0.463 | 54.08 | 0.044 | 47.0 |

Trials 26 and 27 illustrate that bulk hardness of about 47 HRC can be obtained for J153 alloys with 1.9 to 2% C, 0.2 to 0.5% Mn, about 2% Si, 31-32% Cr, about 1.9% Mo, 1.1 to 1.5% W, 3.1 to 3.4% Nb, 1.6 to 2% Ni, 0.4 to 0.6% B, 54 to 56% Fe, and 0.004 to 0.05% V.

TABLE 10 provides a summary of the compositional ranges and a preferred compositional range of the J153 alloy, based on the twenty-seven experimental and production heats (summarized in TABLES 1-9). Incidental impurities in the J153 alloy can include one or more of Al, As, Bi, Cu, Ca, Ce, Co, Hf, Mg, N, P, Pb, S, Sn, Ti, Y and Zn. Preferably, a total content of incidental impurities is 1.5 weight % or less. Due to the limitations of some furnace equipment (e.g., open air induction furnace), nitrogen content can be difficult to control. Preferably, the maximum concentration of nitrogen is less than 0.30 weight %.

TABLE 10

| Element | J153 Alloy Compositional Range (weight %) | J153 Alloy Compositional Preferred Range (weight %) |
|---|---|---|
| C | 1-3 | 1.5-2.3 |
| Si | 1-3 | 1.6-2.3 |
| Ni | 0-3 | 0.2-2.2 |
| Cr | 25-35 | 27-34 |
| Mo | 1.5-3 | 1.7-2.5 |
| W | 0-2 | 0.04-2 |
| Nb | 2-4 | 2.2-3.6 |
| V | 0-3 | 0-1 |
| Ta | 0-3 | 0-1 |
| B | 0-1.2 | 0-0.7 |
| Mn | 0-1 | 0.1-0.6 |
| Fe | Balance | Balance |

Hot Hardness Evaluation

Samples of the J153 alloy from Trial 26 (Heat 8G24XA) were evaluated for hot hardness at temperatures up to 1600° F. (871° C.) with the Vickers hardness testing technique following ASTM E92-82 (2003) (standard test method for Vickers hardness of metallic materials). For comparative purposes, another iron-based alloys including J133 (ferrite and carbide-type duplex heat-resistant steel) and J120V (cast version of M2 martensitic tool steel used for intake and exhaust valve applications) were also tested for hot hardness.

Each test sample was measured at nine successive temperature points (200° F., 400° F., 600° F., 800° F., 1000° F., 1400° F. and 1600° F.) in a vacuum chamber evacuated to a pressure of $10^{-5}$ Torr prior to heating. Three Vickers hardness impressions were made in each sample using a diamond pyramid indenter with a 10 kg load after the temperature was stabilized at each temperature point. The impression diagonal lengths were measured after the sample had cooled to room temperature. The J153 alloy tested had a hot hardness of about 480 HV10 at 75° F., preferably 450 to 500 HV10 at 75° F., about 290 HV10 at 1000° F., preferably 200 to 300 HV10 at 1000° F., and about 60 HV10 at 1600° F., preferably 55 to 70 HV10 at 1600° F. The results of the hot hardness test are summarized in TABLE 11.

TABLE 11

| Temperature (° F.) | Hot Hardness (HV10) | | |
|---|---|---|---|
| | J153 | J133 | J120V |
| 75 | 481 | 420 | 536 |
| 200 | 431 | 407 | 530 |
| 400 | 407 | 394 | 493 |
| 600 | 404 | 368 | 465 |
| 800 | 382 | 351 | 416 |
| 1000 | 291 | 261 | 344 |
| 1200 | 189 | 148 | 209 |
| 1400 | 105 | 95 | 104 |
| 1600 | 64 | 50 | 103 |

From the hot hardness testing, the J153 alloy exhibited greater hot hardness in comparison to J133 (ferrite and carbide-type duplex heat-resistant steel) for the entire temperature range. As illustrated in TABLE 11, the values for hot hardness of J153 fall between J133 and J120V for the entire temperature range.

Preferably, the insert exhibits a decrease in hardness of 65% or less when heated from about room temperature to about 1000° F. For example, from TABLE 11, the insert exhibits an HV10 Vickers hardness from at least about 480 HV10 at about room temperature to at least about 290 HV10 at about 1000° F.

Compressive Yield Strength

Samples of the J153 alloy (Trial 1, Heat 7J22XA; Trial 2, Heat 7J22XB; Trial 4, Heat 7K12XA) were evaluated to determine compressive yield strength following ASTM E209-89a (2000) (Standard Practice for Compression Tests of Metallic Materials at Elevated Temperatures with Conventional or Rapid Heating Rates and Strain Rates) at four temperature points up to 1000° F. For comparative purposes other valve seat insert alloys, including a cobalt-based alloy (J3 or STELLITE 3®) and a ferrite and carbide-type duplex heat-resistant steel (J133), were also evaluated. Results of this testing are summarized in TABLES 12-15.

TABLE 12

| Temperature | Compressive Yield Strength (KSi) | | |
|---|---|---|---|
| (° F.) | 7K12XA | 7J22XA | 7J22XB |
| 75 | 131.0 | 212.7 | 98.2 |
| 600 | 108.5 | 178.1 | 80.9 |
| 800 | 98.2 | 178.4 | 78.3 |
| 1000 | 73.2 | 127.7 | 72.9 |

TABLE 13

| Temperature | Elastic Modulus (MSi) | | |
|---|---|---|---|
| (° F.) | 7K12XA | 7J22XA | 7J22XB |
| 75 | 32.9 | 34.8 | 33.8 |
| 600 | 27.9 | 31.6 | 25.1 |
| 800 | 25.6 | 32.9 | 28.0 |
| 1000 | 22.2 | 30.8 | 28.5 |

TABLE 14

| Temperature | Poisson's Ratio | | |
|---|---|---|---|
| (° F.) | 7K12XA | 7J22XA | 7J22XB |
| 75 | 0.279 | 0.256 | 0.276 |
| 600 | n/a | n/a | n/a |
| 800 | n/a | n/a | n/a |
| 1000 | n/a | n/a | n/a |

TABLE 15

| Temperature (° F.) | Compressive Yield Strength (KSi) | | | Elastic Modulus (MSi) | | | Poisson's Ratio | | |
|---|---|---|---|---|---|---|---|---|---|
| | J153 (7K12XA) | J133 | J3 | J153 (7K12XA) | J133 | J3 | J153 (7K12XA) | J133 | J3 |
| 75 | 131.0 | 89 | 116.8 | 32.9 | 33.6 | 31.6 | 0.279 | 0.279 | 0.290 |
| 600 | 108.5 | 77 | 94.1 | 27.9 | 27.1 | 30.3 | n/a | n/a | n/a |
| 800 | 98.2 | 77 | 90.5 | 25.6 | 25.2 | 25.0 | n/a | n/a | n/a |
| 1000 | 73.2 | 59 | 92.8 | 22.2 | 23.0 | 24.7 | n/a | n/a | n/a |

A good correlation between the bulk hardness and compressive yield strength was revealed in the three J153 alloy samples. At 800° F. or lower, J153 alloy has greater compressive yield strength than J3 and J133. At 1000° F., the compressive yield strength of J153 alloy falls between that of J3 and J133.

Microstructure Characterization

Figure 2A:
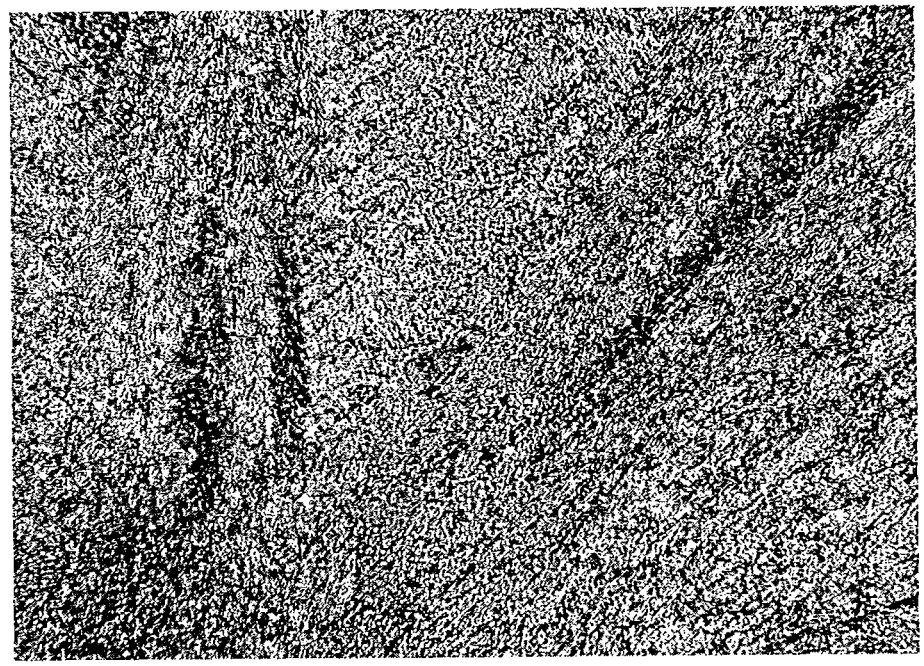
FIGS. 2A-2B are optical micrographs of the J153 alloy in the as-cast condition.
Figure 2B:
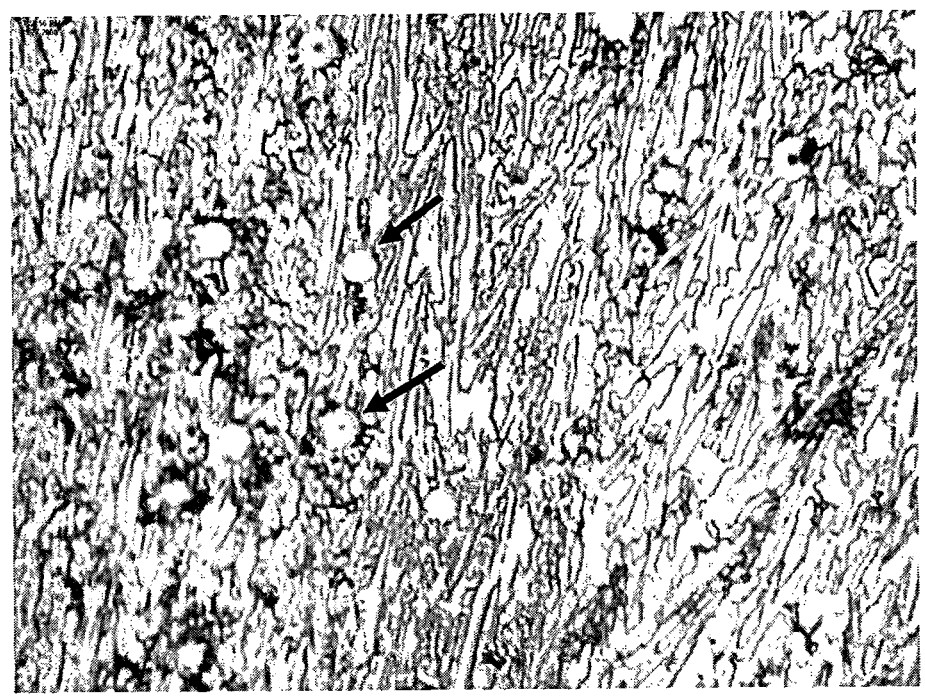

FIGS. 2A and 2B are optical micrographs of an electrolytically etched as-cast J153 alloy. As illustrated in FIG. 2A, the microstructure of the as-cast J153 alloy can be characterized as a lamellar microstructure of high chromium ferrite and chromium-rich carbide phases. The primary carbides have an acicular microstructure with typical cross-sectional dimension of less than 2.5 µm. The ferrite phase has a semi-acicular microstructure. As indicated by the arrows in FIG. 2B, spherical and/or polyhedron-shaped MC/MN/MCN particles are evenly dispersed along the ferrite-primary carbide phase boundaries. The average size of the MC/MN/MCN particles is about 5 µm.

Figure 3A:
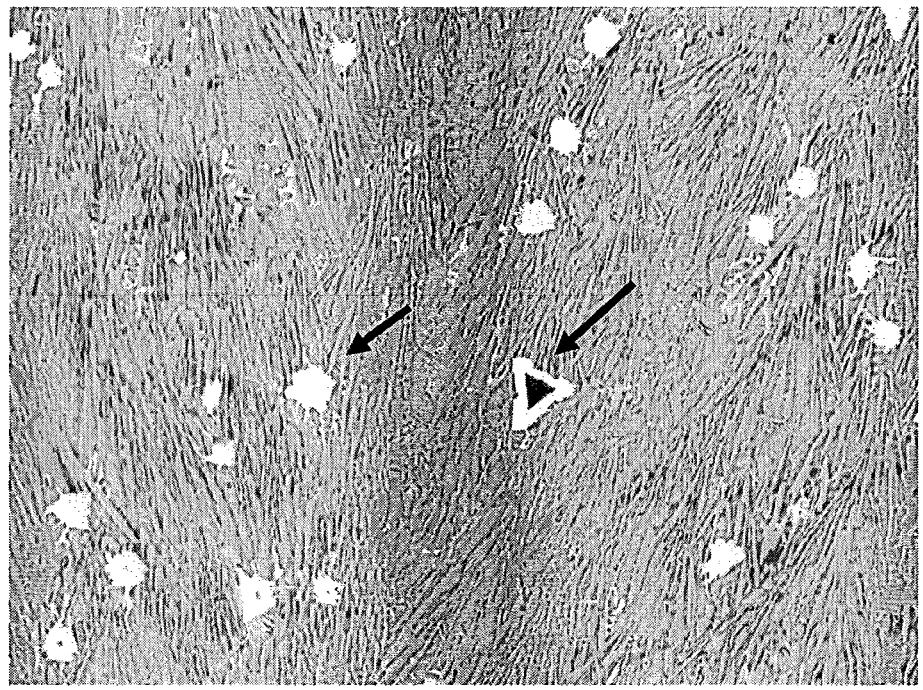
FIGS. 3A-3B are scanning electron microscopy micrographs of the J153 alloy in the as-cast condition.
Figure 3B:
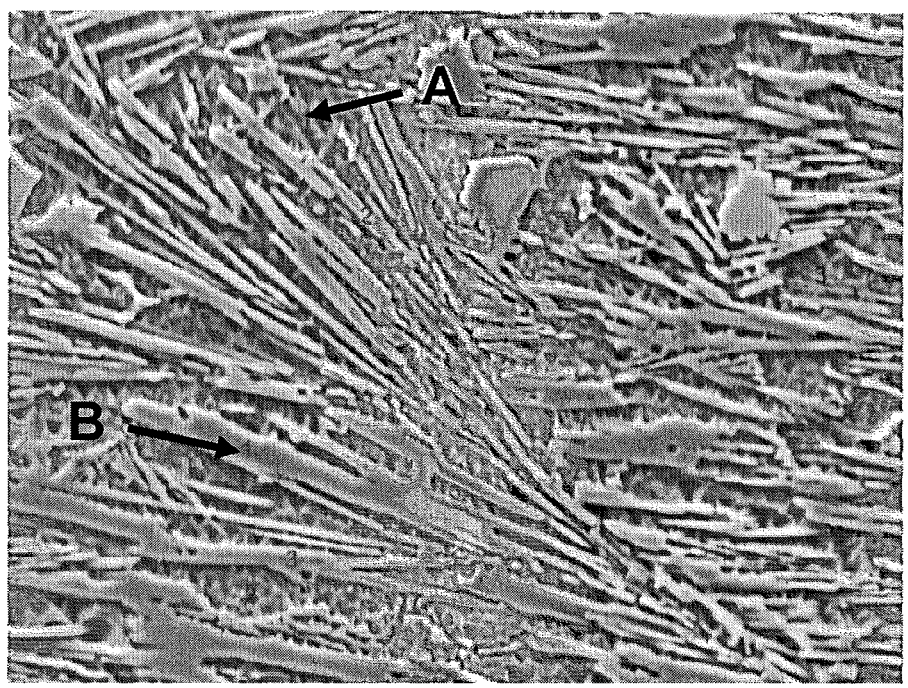

FIGS. 3A and 3B are scanning electron microscopy (SEM) micrographs illustrating an enlarged view of the J153 alloy microstructure, including the three major phases: (1) acicular primary carbides; (2) semi-acicular ferrite; and (3) spherical and/or polyhedron-shaped MC/MN/MCN particles evenly dispersed along the ferrite and primary carbide phases. Each of the features was further characterized by energy dispersive x-ray spectroscopy (EDS).

FIG. 3A illustrates evenly dispersed spherical and/or polyhedron-shaped particles (as indicated by the arrows) along the ferrite and primary carbide phases. FIG. 3B further illustrates two characteristic microstructural features of the J153 alloy wherein Region A illustrates ferrite phases and Regions B illustrates primary carbide phases.

An EDS analysis of the primary carbide indicates a chromium- and molybdenum-rich carbide. An EDS analysis of the ferrite region indicates a high-chromium ferrite. An EDS analysis of the spherical and/or polyhedron-shaped particles indicates a niobium-rich metal carbide, metal nitride and/or metal carbonitride. The analysis further indicated a boron-rich phase evenly dispersed along the carbide-ferrite phase boundaries, immediately adjacent to the spherical and/or polyhedron-shaped particles. Thus, the presence of the boron-rich phase likely results in the nucleation of spherical and/or polyhedron-shaped particles along the carbide-ferrite phase boundaries.

Linear Thermal Expansion Coefficient

Thermal expansion coefficient of Trial 5 (Heat 7K26XA) was measured using a Model 1000-D dilatometer, available from Orton, Westerville, Ohio). Testing was carried out in an argon atmosphere from ambient temperature to about 600° C. For comparative purposes, another valve seat insert alloy, including J133 (ferrite and carbide-type duplex heat-resistant steel) was also analyzed by dilatometry. All of the J-Series alloys are available from L.E. Jones Company, located in Menominee, Mich. The dilatometry samples had a cylindrical geometry, about 1 inch in length and about 0.5 inch in diameter. The linear thermal expansion coefficient measurements were conducted perpendicular to the primary directional solidification orientation for these alloys. The results of the dilatometry analysis are summarized in TABLE 16.

TABLE 16

| Temp. | Linear Thermal Expansion Coefficient ($\times 10^{-6}$/° C.) | |
|---|---|---|
| (° C.) | J153 (7K26XA) | J133 |
| 45-100 | 8.93 | 10.41 |
| 45-200 | 10.31 | 11.01 |
| 45-300 | 10.78 | 11.44 |
| 45-400 | 11.15 | 11.44 |
| 45-500 | 11.39 | 11.71 |
| 45-600 | 11.63 | 11.94 |

As illustrated in TABLE 16, the linear thermal expansion coefficient for the J153 alloy is about 16.6% lower (at 100°

C.) to about 2.6% lower (at 600° C.) than a comparable ferrite and primary carbide-type duplex heat-resistant stainless steel (i.e., J133).

Thermal Conductivity

Thermal conductivity of valve seat insert materials can affect their performance. A valve seat insert material with high thermal conductivity is desirable because it can effectively transfer heat away from engine valves to prevent overheating. Thermal conductivity of J153 alloy samples was measured following ASTM E1461-01 (standard test method for thermal diffusivity of solids by the flash method).

The measurement was performed in a NETZSCH LFA 457 MicroFlash™ system on disc-shaped samples with a diameter of 0.5", a thickness of 0.079", and with a surface roughness of 50 microinches or less. A sample aligned between a neodymium glass laser (1.06 mm wavelength, 330 ms pulse width) and an indium antimonide (InSb) infrared detector in a high temperature furnace. During the measurement, the sample is stabilized at a test temperature before being heated using laser pulses on one surface of the sample. Temperature rise from the opposite surface was measured by the infrared detector.

A comparison between the thermal conductivity of the J153 alloy and J133 alloy is summarized in TABLE 17.

TABLE 17

| Temperature (° C.) | Thermal Conductivity (Wm$^{-1}$K$^{-1}$) | |
| --- | --- | --- |
| | J153 | J133 |
| 25 | 11.8 | 12.3 |
| 100 | 13.0 | 13.6 |
| 200 | 14.6 | 14.9 |
| 300 | 16.8 | 16.4 |
| 400 | 18.2 | 17.8 |
| 500 | 20.4 | 19.0 |
| 600 | 20.4 | 20.2 |
| 700 | 20.6 | 21.4 |

Dimensional Stability Testing

Five sample valve seat inserts of approximately 1.7 inch diameter were made of the J153 alloy with the composition from Trial 21 (Heat 8E30XA). Before the measurement, the samples were tempered 1325° F. for 5 hours. Then, these sample valve seat inserts were evaluated for dimensional stability by measuring their dimensional changes before and after aging at 1200° F. for 20 hours. Outer diameters (O.D.) of the sample valve seat inserts were measured at two locations spaced 90° apart (i.e., 0°-180° orientation and 90°-270° orientation). The maximum allowable change in O.D. is 0.3× 10$^{-3}$ inches per inch diameter. Maximum allowable change on a 1.7 inch diameter insert is ±0.00051 inches. The results of the dimensional stability measurement are summarized in TABLE 18.

TABLE 18

Dimensional Stability Test of 1.7 inch diameter insert maximum allowable change is 0.00051 inches

| Sample | O.D. Size Pre-Aging | | O.D. Size Post-Aging | | Average Dimensional Change | |
| --- | --- | --- | --- | --- | --- | --- |
| | 0°-180° | 90°-270° | 0°-180° | 90°-270° | change | status |
| 1 | 1.6958 | 1.6959 | 1.6955 | 1.6955 | −0.00035 | pass |
| 2 | 1.6956 | 1.9655 | 1.6953 | 1.6950 | −0.0004 | pass |
| 3 | 1.6958 | 1.6957 | 1.6954 | 1.6952 | −0.00045 | pass |
| 4 | 1.6957 | 1.6952 | 1.6953 | 1.9652 | −0.0004 | pass |
| 5 | 1.6958 | 1.6959 | 1.6955 | 1.6955 | 0.00035 | pass |

Wear Resistance

Wear resistance analysis of the J153 alloy was conducted on a Plint Model TE77 Tribometer, which can accurately predict wear resistance under simulated service conductions during testing in diesel and natural gas engines. The wear resistance analysis was conducted by sliding pin-shaped samples of J153 (Trial 5, Heat 7K26XA), J130, J160 and J133 alloys against a plate sample of Chromo 193® alloy (a Cr (17.5 weight %)—Mo (2.25 weight %) steel typically used in intake valves), at a set of temperature points following ASTM G133-95 (standard test method for determining sliding wear of wear-resistant materials using a linearly reciprocating ball-on-flat geometry). A force of 20 N was applied on the pin-shaped sample against a plate sample while sliding the pin-shaped sample by a 1 mm sliding length at 20 Hz at eight temperature points (25° C., 200° C., 250° C., 300° C., 350° C., 400° C., 450° C. and 500° C.) for 100,000 cycles. All analyses were conducted in ambient atmosphere without lubrication. The results of Plint wear resistance analyses are summarized in TABLE 19.

TABLE 19

| | Wear of Test Pairs (mg) | | | | | | | | | | | |
| --- | --- | --- | --- | --- | --- | --- | --- | --- | --- | --- | --- | --- |
| Temp. | J153/Chromo 193® | | | J133/Chromo 193® | | | J130/Chromo 193® | | | J160/Chromo 193® | | |
| (° C.) | Plate | Pin | Total | Plate | Pin | Total | Plate | Pin | Total | Plate | Pin | Total |
| 25 | 1.8 | 0.7 | 2.5 | 2.6 | 5.1 | 7.7 | 2.2 | 1.3 | 3.5 | 0.9 | 1.4 | 2.3 |
| 200 | 2.6 | 0.8 | 3.4 | 1.5 | 0.4 | 1.9 | 0.1 | 0.6 | 0.7 | 1.4 | 1.4 | 2.8 |
| 250 | 1.9 | 1.7 | 3.6 | 1.1 | 0.8 | 1.9 | 0.8 | 1.1 | 1.9 | 0.1 | 1.1 | 1.2 |
| 300 | 1.1 | 1.2 | 2.3 | 0.9 | 0. | 1.3 | 1.3 | 0.1 | 1.4 | 0.6 | 1.0 | 1.6 |
| 350 | 0.3 | 2.9 | 3.2 | 0.2 | 2.1 | 2.3 | 0.7 | 0.1 | 0.8 | 0.0 | 1.2 | 1.2 |
| 400 | 0.2 | 4.1 | 4.3 | 0.1 | 0.9 | 1.0 | 0.3 | 0.1 | 0.4 | 0.0 | 1.2 | 1.2 |
| 450 | 0.1 | 3.3 | 3.4 | 0.1 | 1.9 | 2.0 | 1.5 | 0.4 | 1.9 | 2.1 | 0.8 | 2.9 |
| 500 | 0.6 | 5.7 | 6.3 | 0.2 | 2.3 | 2.5 | 1.4 | 1.2 | 2.6 | 0.2 | 1.1 | 1.3 |

Corrosion Resistance

Corrosion resistance is a major challenge for valve train component applications especially for valve and valve seat insert. From the compositional design, alloy J153 is expected to possess not only an excellent general corrosion resistance by virtue of its high chromium content, but also adequate localized corrosion resistance via additions of niobium and molybdenum. Alloy addition such as Nb and/or Mo can contribute to reducing intergranular stress corrosion, stress corrosion cracking and/or pitting corrosion.

Heat Treatment and Crush Testing of Castings

The J153 alloy from Trial 19 (Heat 8E21XA) was cast into valve seat inserts with a bulk hardness of about 48 HRC. Initially, all valve seat inserts were stress relieved at about 1325° F. for about 3.5 hours. After completion of the stress relief, the valve seat inserts had an average buck hardness of about 45 HRC.

Multiple valve seat inserts (i.e. three to five) were subjected to one of the followings heat treatments: (1) four hours at 900° F., 1000° F., 1100° F. and 1500° F. and cooled in still air; (2) fifteen hours at 900° F., 1100° F. and 1500° F. and cooled in still air; (3) two hours at 1850° F. (i.e., precipitation hardening), air quenching, three hours at 1300° F. (i.e., tempering); and (4) two hours at 1700° F. (i.e., precipitation hardening), air quenching, three hours at 1300° F. (i.e., tempering). After each heat treatment, each valve seat insert was tested for bulk hardness and the results are summarized in TABLES 20A-20B. The hardness values in TABLES 20A-20B are averages of five measurements.

Each as-cast and heat treated valve seat insert was subjected to radial crush testing in ambient conditions to evaluate toughness. Crush testing was evaluated according to a modified version of the Metal Powder Industry Federation Standard 55 (determination of radial crush strength of powder metallurgy test specimens). A compressive load was applied to each valve seat insert in the radial orientation. The peak force and deformation at rupture obtained from radial crush testing is summarized in TABLES 20A-20B. The peak force and deflection data is an average value of three to five measurements.

TABLE 20A

| Heat Treatment | Hardness (HRC) | Peak Force (lbs.) | Total Deflection (in.) | Toughness Index (in.-lbs./100) |
|---|---|---|---|---|
| 900° F., 4 hrs. | 44.8 | 379.8 | 0.029 | 0.110 |
| 1000° F., 4 hrs. | 43.4 | 443.2 | 0.030 | 0.136 |
| 1100° F., 4 hrs. | 44.3 | 391 | 0.028 | 0.114 |
| 1300° F., 4 hrs. | 44.3 | 429.2 | 0.030 | 0.128 |
| 1500° F., 4 hrs. | 49.1 | 309.8 | 0.031 | 0.094 |
| 900° F., 15 hrs. | 45.0 | 416.6 | 0.031 | 0.126 |
| 1100° F., 15 hrs | 45.0 | 400.6 | 0.031 | 0.125 |
| 1500° F., 15 hrs. | 50.1 | 321.6 | 0.035 | 0.112 |

TABLE 20B

| | Hardness (post-quenching) (HRC) | Hardness (post-tempering) (HRC) | Peak Force (lbs.) | Total Deflection (in.) | Toughness Index (in.-lbs./100) |
|---|---|---|---|---|---|
| Harden (1850° F., 2 hrs.); Air Quench; Temper (1300° F., 3 hrs.) | 51.0 | 52.0 | 265.4 | 0.035 | 0.094 |
| Harden 1700° F., 2 hrs.; air quench; Temper 1300° F., 3 hrs. | 51.0 | 51.7 | 315.3 | 0.033 | 0.104 |

As illustrated in TABLE 20A, for the 4 hour heat treatments at temperatures of 900° F., 1000° F., 1100° F. and 1300° F., bulk hardness values from 43.4 HRC to 44.8 HRC were observed. However, for the 4 hour heat treatment at 1500° F., an increase in bulk hardness to 49.1 HRC was observed. Likewise, for the hour heat treatments at temperatures of 900° F. and 1100° F., bulk hardness value of 45 HRC was observed. However, for the 15 hour heat treatment at 1500° F., an increase in bulk hardness to 50.1 HRC was observed. Thus, the heat treatment data of TABLE 20A suggests that 1500° F., the J153 valve seat insert was strengthened by precipitation hardening.

As illustrated in TABLE 20B, after a hardening heat treatment of 1850° F. for 2 hours and air quenching, a bulk hardness value of 51 HRC was observed. After further tempering at 1300° F. for 3 hours, an increase in bulk hardness to 51.7 HRC was observed. Likewise, after a precipitation hardening heat treatment of 1700° F. for 2 hours and air quenching, a bulk hardness value of 51 HRC was observed. After further tempering at 1300° F. for 3 hours, an increase in bulk hardness to 52 HRC was observed. From TABLE 20B, the step of tempering at 1300° F. for 3 hours had a minimal effect on the bulk hardness of the J153 valve seat insert. Thus, the increase in bulk hardness was likely due to precipitation hardening, rather than the formation of martensite due to air quenching.

The heat treatment can be carried out in an inert, oxidizing, or reducing atmosphere (e.g., nitrogen, argon, air or nitrogen-hydrogen mixture), or in a vacuum. The temperature and time of the heat treatment can be varied to optimize the hardness and/or strength of the J153 alloy.

From TABLES 20A-20B, it was determined that a heat treatment of the shaped component (e.g., valve seat insert) can be adjusted to produce a toughness index of the shaped component after heat treating that is lower than a toughness index of the shaped component before heat treating. Increased toughness is beneficial for machining of shaped components, due to improved crack resistance in grinding operations.

In another embodiment, the J153 alloy can be formed into a shaped component by powder metallurgy. For example, metal powders of the chromium-iron alloy can be pressed into a green shaped component and sintered at temperatures from about 1950° F. to about 2300° F., preferably about 2050° F. The shaped component is preferably sintered in a reducing atmosphere. For example, the reducing atmosphere can be hydrogen or a mixture of nitrogen and dissociated ammonia.

The preferred embodiments are merely illustrative and should not be considered restrictive in any way. The scope of the invention is given by the appended claims, rather than the preceding description, and all variations and equivalents which fall within the range of the claims are intended to be embraced therein.

What is claimed is:

1. A chromium-iron alloy comprising in weight %:
1 to 3% C;
1 to 3% Si;
up to 3% Ni;
25 to 35% Cr;
1.5 to 3% Mo;
up to 2% W;
2.0 to 4.0% Nb;
up to 3.0% V;
up to 3.0% Ta;
up to 1.2% B;
up to 1% Mn;
43 to 64% Fe; and
comprising a ferrite-carbide matrix with spherical and/or polyhedron-shaped particles distributed throughout the ferrite-carbide matrix.

2. The chromium-iron alloy of claim 1 comprising in weight %:
1.5 to 2.3% C;
1.6 to 2.3% Si;
0.2 to 2.2% Ni;
27 to 34% Cr;
1.7 to 2.5% Mo;
0.04 to 2% W;
2.2 to 3.6% Nb;
up to 1% V;
up to 1.0% Ta;
up to 0.7% B;
0.1 to 0.6% Mn;
43 to 64% Fe.

3. The chromium-iron alloy of claim 1, further comprising incidental impurities of one or more of Al, As, Bi, Cu, Ca, Ce, Co, Hf, Mg, N, P, Pb, S, Sn, Ti, Y and Zn with a total content of incidental impurities of 1.5 weight % or less.

4. The chromium-iron alloy of claim 1, wherein the ferrite-carbide matrix comprises a primary carbide phase having an acicular microstructure and a ferrite phase having a semi-acicular microstructure; and the spherical and/or polyhedron-shaped particles are metal carbides, metal nitrides and/or metal carbonitrides dispersed along phase boundaries of the primary carbide phase and the ferrite phase.

5. The chromium-iron alloy of claim 4, wherein the primary carbide phase is chromium-rich and molybdenum-rich; the ferrite phase is chromium-rich; and the phase boundaries of the primary carbide phase and the ferrite phase are boron-rich.

6. A valve seat insert made essentially of the chromium-iron alloy of claim 1.

7. The valve seat insert of claim 6, wherein the insert is a casting.

8. A method of manufacturing the valve seat insert of claim 6, comprising machining a piece of the chromium-iron alloy.

9. A method of manufacturing an internal combustion engine comprising inserting the valve seat insert of claim 6 in a cylinder head of the internal combustion engine.

10. The method of claim 9, wherein the engine is a diesel or natural gas engine.

11. A method of operating an internal combustion engine comprising closing a valve against the valve seat insert of claim 6 to close a cylinder of the internal combustion engine and igniting fuel in the cylinder to operate the internal combustion engine.

12. The method of claim 11, wherein the valve:
(i) is a high-chromium iron-based alloy or a high-temperature, nickel-based superalloy; or
(ii) the valve is hard-faced with a high temperature, wear-resistant alloy strengthened by carbides.

13. A chromium-iron alloy comprising in weight %:
1 to 3% C;
1 to 3% Si;
up to 3% Ni;
25 to 35% Cr;
1.5 to 3% Mo;
up to 2% W;
2.0 to 4.0% Nb;
up to 3.0% V;
up to 3.0% Ta;
up to 1.2% B;
up to 1% Mn;
43 to 64% Fe;
wherein the chromium-iron alloy has an as-cast bulk hardness from 40 to 56 Rockwell C; a hot hardness (HV10) from 450 to 500 at 75° F., from 280 to 300 at 1000° F., from 55 to 70 at 1600° F.; a compressive yield strength from 90 to 220 KSi at 75° F., from 70 to 130 at 1000° F.; a linear thermal expansion coefficient from $8\times10^{-6}$ to $12\times10^{-6}/°$ C.

14. A valve seat insert made of a chromium-iron alloy comprising in weight %:
1 to 3% C;
1 to 3% Si;
up to 3% Ni;
25 to 35% Cr;
1.5 to 3% Mo;
up to 2% W;
2.0 to 4.0% Nb;
up to 3.0% V;
up to 3.0% Ta;
up to 1.2% B;
up to 1% Mn;
43 to 64% Fe;
wherein the insert exhibits a dimensional stability of less than $0.3\times10^{-3}$ inch per inch of insert outside diameter (O.D.) after heating for 20 hours at 1200° F.

15. A method of making a chromium-iron alloy comprising in weight %:
1 to 3% C;
1 to 3% Si;
up to 3% Ni;
25 to 35% Cr;
1.5 to 3% Mo;
up to 2% W;
2.0 to 4.0% Nb;
up to 3.0% V;
up to 3.0% Ta;
up to 1.2% B;
up to 1% Mn;
43 to 64% Fe;
wherein:
(a) the chromium-iron alloy is cast into a shaped component from a melt at a temperature from about 2700° F. to about 3000° F.; or
(b) a powder of the chromium-iron alloy is pressed into a shaped component and sintered at a temperature from about 1950° F. to about 2300° F. in a reducing atmosphere, wherein the reducing atmosphere is hydrogen or a mixture of dissociated ammonia and nitrogen.

16. The method of claim 15, further comprising a high temperature tempering heat treatment at about 1325° F. for about 5 hours.

* * * * *